United States Patent [19]

Giesselmann et al.

[11] Patent Number: 4,846,935

[45] Date of Patent: Jul. 11, 1989

[54] CONCENTRATION OF VOLATILE COMPOUNDS FROM SOLID OR LIQUID MATERIAL

[75] Inventors: Günter Giesselmann, Heusenstamm; Andreas Hartmann; Karl-Heinz Bruckner, both of Mömbris, all of Fed. Rep. of Germany

[73] Assignee: Degussa Aktiengesellschaft, Frankfurt am Main, Fed. Rep. of Germany

[21] Appl. No.: 44,290

[22] Filed: Apr. 30, 1987

[30] Foreign Application Priority Data

May 15, 1986 [DE] Fed. Rep. of Germany ....... 3616309

[51] Int. Cl.⁴ ............................................. B01D 3/00
[52] U.S. Cl. .................... 203/86; 202/267.1; 426/489; 426/494
[58] Field of Search ................... 203/86, 91, DIG. 13; 202/239, 267.1; 159/47.1; 220/85 VR, 85 VS

[56] References Cited

U.S. PATENT DOCUMENTS

| | | | |
|---|---|---|---|
| 1,851,961 | 3/1932 | Lowenstein | 203/86 |
| 3,658,581 | 4/1972 | Paul et al. | 203/86 |
| 4,003,257 | 1/1977 | Fletcher et al. | 55/67 |
| 4,118,285 | 10/1978 | Yeh | 203/86 |
| 4,416,758 | 11/1983 | Tseung et al. | 204/284 |
| 4,463,025 | 7/1984 | Strobel | 426/492 |
| 4,478,685 | 10/1984 | Mortenson | 203/86 |
| 4,647,466 | 3/1987 | Vapikse et al. | 426/387 |
| 4,675,198 | 6/1987 | Sevenants | 426/425 |

FOREIGN PATENT DOCUMENTS

| | | | |
|---|---|---|---|
| 0136101 | 8/1984 | Japan | 203/86 |
| 0949271 | 2/1964 | United Kingdom | 203/86 |

Primary Examiner—David L. Lacey
Assistant Examiner—Virginia Manoharan
Attorney, Agent, or Firm—Cushman, Darby & Cushman

[57] ABSTRACT

A heavy concentration of volatile substances and high degree of purity are achieved in a short time in a closed system by transferring the volatile substances from a vessel containing the gas phase into a condensation vessel by means of a capillary with a small inner diameter. Preferably there is a temperature drop from the vessel containing the gas phase to the condensation vessel.

7 Claims, 4 Drawing Sheets

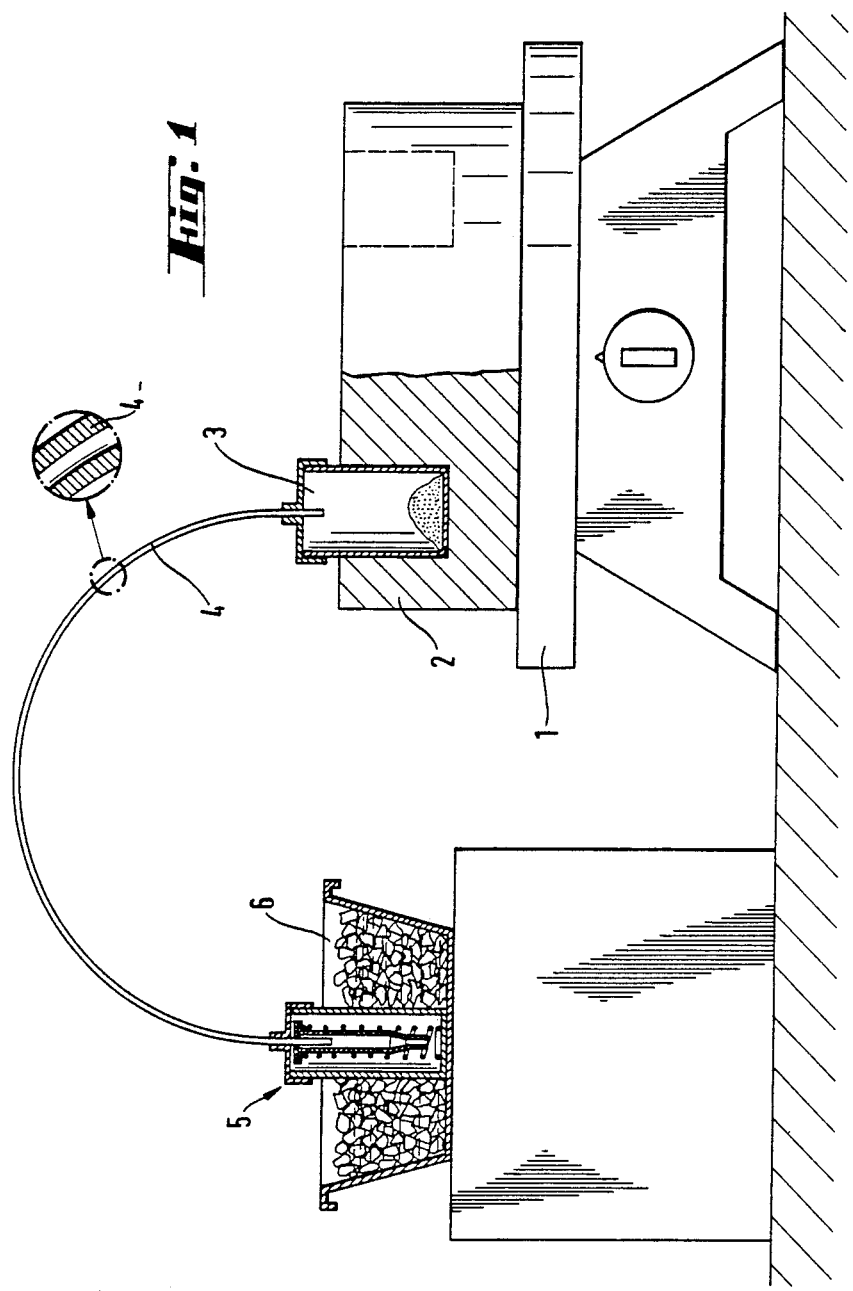

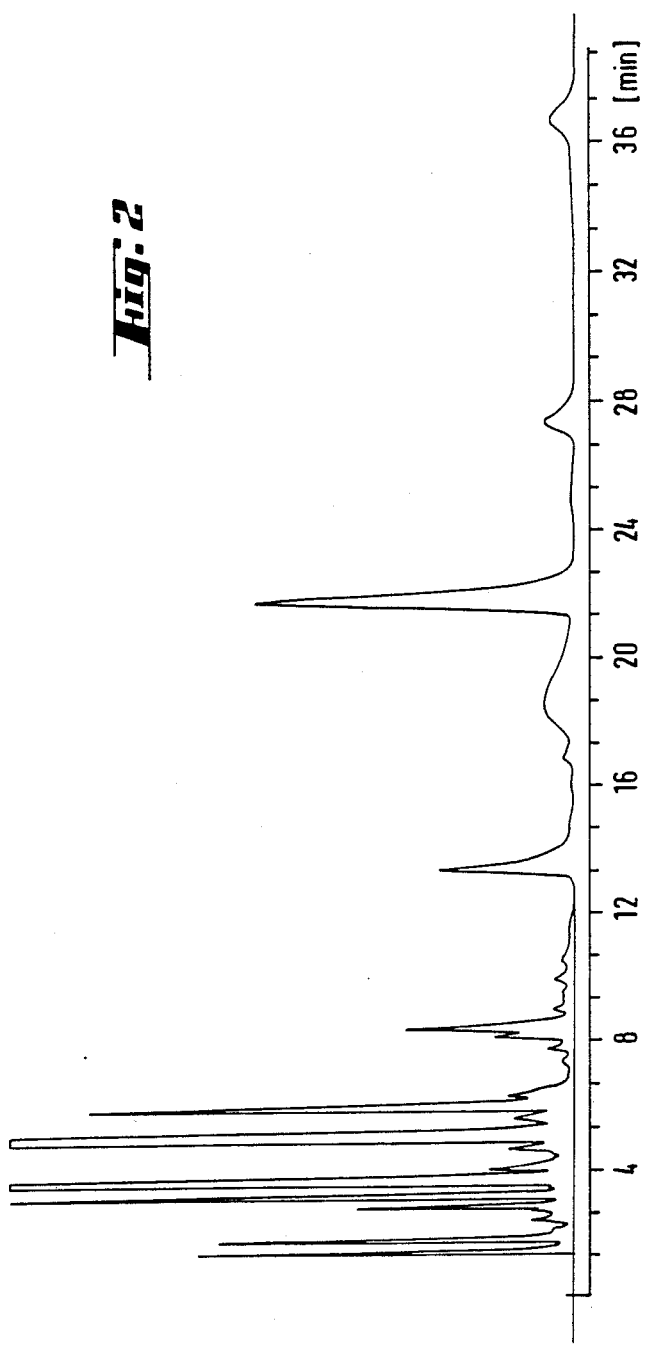

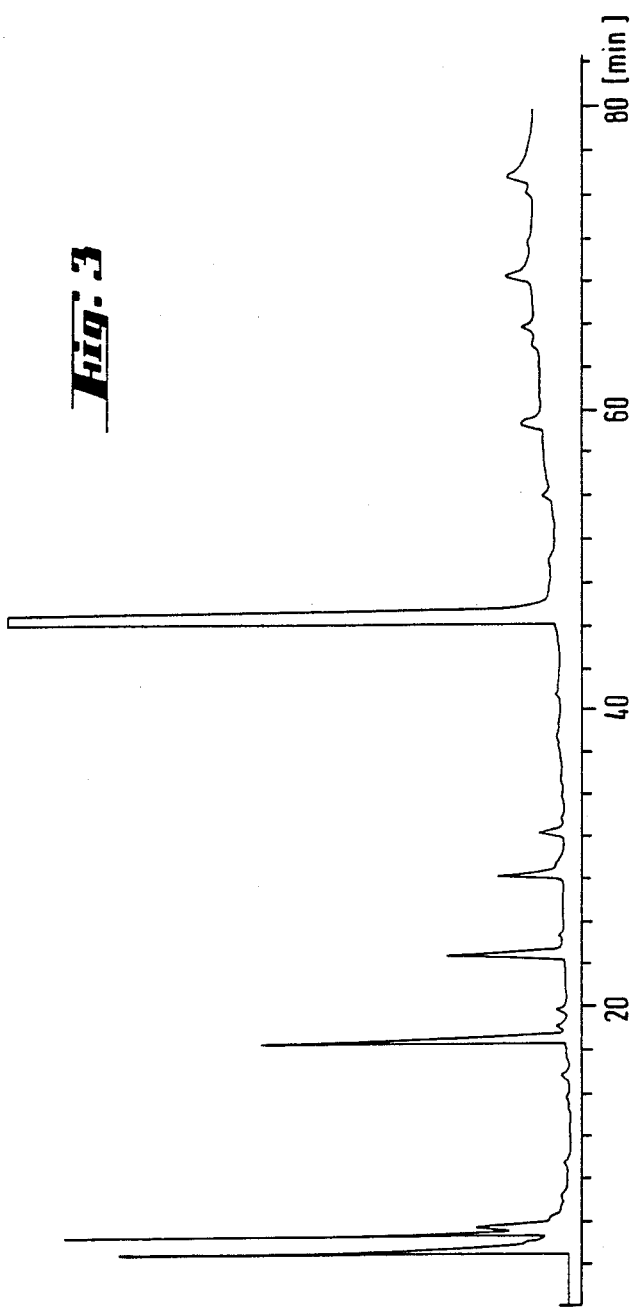

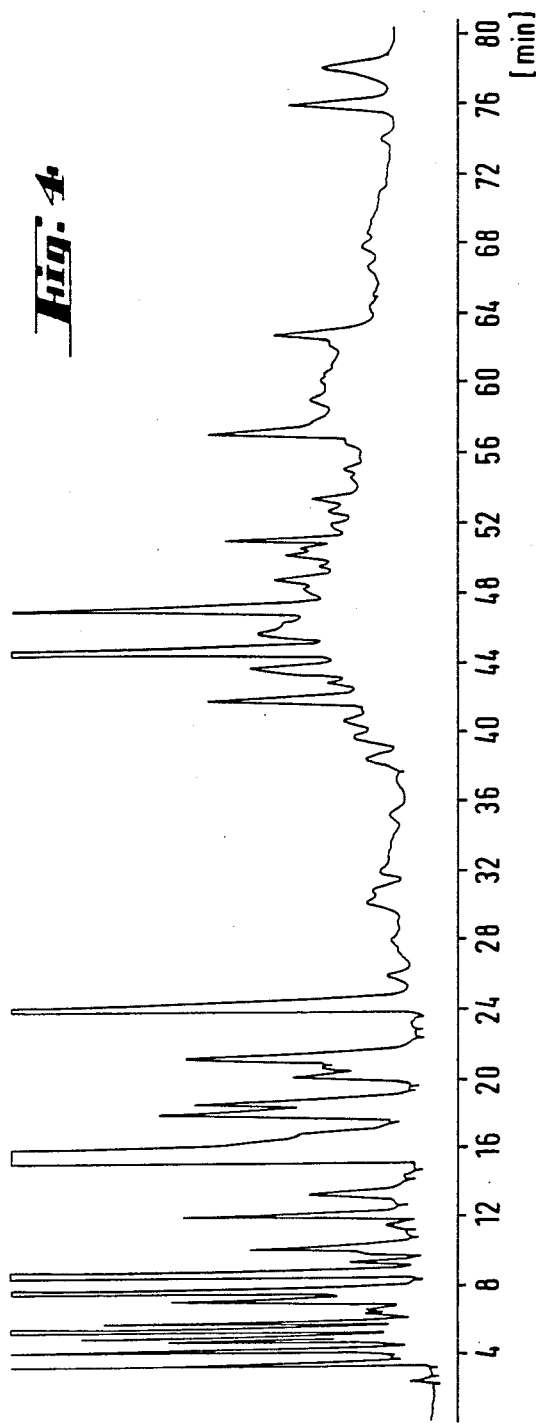

CONCENTRATION OF VOLATILE COMPOUNDS FROM SOLID OR LIQUID MATERIAL

The present invention relates to a new technique for concentrating volatile compounds from gas phases. It is particularly concerned with gas phases which are in equilibrium with a liquid or solid phase.

SUMMARY OF THE INVENTION

The object of the invention is to create a method for the multiple concentration of volatile compounds from gas phases without the use of auxiliary agents in a closed system.

In accordance with the invention it has been found that the volatile compounds in a closed system can be extracted and heavily concentrated at the same time from the gas phase if the volatile substance are transferred by means of at least one capillary from the vessel containing the gas phase into a second container. The volatile substances are extracted from a liquid or solid which is placed in the first vessel, out of contact with the capillary, so that only the volatile substances are in contact with the capillary.

BRIEF DESCRIPTION OF FIGURES IN DRAWING

In the drawing:

FIG. 1 illustrates schematically an apparatus for carrying out the invention; and FIGS. 2, 3 and 4 show HPLC chromatograms of materials separated in accordance with the invention.

DETAILED DESCRIPTION OF PREFERRED EMBODIMENTS

The manner in which the process is carried out is illustrated by way of example in FIG. 1. As shown schematically in that figure, a gas phase containing a volatile substance is placed in a vessel 3, and that vessel is connected to a receiver vessel 5 by a capillary 4. In this embodiment, the vessel 3 is inserted in a cavity in a heatable block 2 on heating plate 1 and the receiver is cooled by placing it is a cooling medium 6.

The capillary which may be used in accordance with the invention may have variable outer diameters, but the inner diameters are less than 1 mm. The capillary length and capillary inner diameter must be selected in such a manner that the transport of the volatile compounds is possible only in the direction of the second, non-aerated container, which functions as a condensation vessel; that is, no back—diffusion may occur. The requirement that back diffusion is not permitted affects the selection of an appropriate inner diameter for the capillary, which depends on the nature of the material from which the capillary is made and the length of the capillary. This can be established by a simple test in which capillaries of various inner diameters are evaluated. For example, it was found in the case of high-grade steel capillaries that the method of the invention can be performed without problems at inner diameters of 0.10 to 0.5 mm; an inner diameter of 0.25 mm was especially advantageous.

The capillaries may be made from a variety of materials. The proper material for any particular process depends on the nature of the volatile compounds to be concentrated. Materials which may be used include metals, glass, quartz and plastics such as, e.g., polyethylene or polyfluoroethylene (Teflon). Especially advantageous metals are steels, particularly high-grade steel, precious metals such as platinum, gold and silver. In addition, other good heat-conducting metals such as, e.g., copper or aluminum may be used. Titanium, zirconium and tantalum can be used for special purposes. All of these metals can also be used in the form of their alloys. For example platinum-iridium may be used in some cases.

The two vessels present in the enclosed system can consist of the same materials as the capillary or capillaries, independently of the temperature of the gas phase to be extracted and the substances which occur thereby.

The method of the invention is suitable on account of its simple handling as well as the purity of the products obtained for isolating a large variety of volatile compounds such as those required, for example, in the perfume industry, aroma research, and cosmetic industry as well as for isolating volatile substances from pharmaceutical products, food products, volatile substances in plant extracts, pesticides and for analytical purposes, e.g. head space analysis in conjunction with gas chromatography and HPLC (high-performance liquid chromatography).

In order to support the concentrating process, it is advantageous to maintain a temperature drop between the gas phase to be extracted and the condensation vessel.

The method of the invention achieves a considerably greater concentration effect than other methods do. The volatile compounds from the gas phase are concentrated in most instances by more that ten times in the condensation vessel in the form of a liquid or solid condensate.

Another advantage of the method of the invention is that no loss of substance is possible, since the work is performed in a closed system. Contaminations by foreign substances are excluded, since no auxiliary agents are used for the extraction. It also has been found that the readily volatile compounds pass the capillary at speeds of greater than 30 cm/sec and are subsequently condensed, if the inner diameter of the capillary is properly selected.

This is the case, for example, if a steel capillary with an inner diameter of 0.25 mm is used. For example, 100 to 200 mg condensed constituents are obtained with this arrangement in 3 hours from a gas volume of 5 ml.

The invention is explained in more detail in the following examples in which the arrangement of FIG. 1 was used.

EXAMPLE 1

Concentration of volatile constituents from garlic.

1.25 g comminuted fresh garlic is weighed and placed in a 10 ml borosilicate gas pressure vessel which is closed at the edges. The pressure vessel with the garlic is connected to a another borosilicate glass pressure vessel, which functions as a receiver, by means of a high-grade steel capillary. The capillary is 150 mm long and has an inner diameter of 0.25 mm. The vessel with the garlic is heated in an aluminum block to 80° C. and the receiver is cooled with ice. After three hours, the process pauses, and the receiver contains a condensate amount of 102 mg. If the first receiver is replaced by a second one, the concentration process resumes, and, after three more hours, a condensate amount of 120 mg is obtained. This process can be repeated so long as it is desired to recover additional volatile compounds.

An RP-18 column containing packing of particle size of 7 micrometers was used as an analytical separating column to analyze the products of Examples 1. It was 250 mm long and the inner diameter was 5 mm. The work was performed at 40° C. and the eluant composition was a mixture of water and acetonitrile in a 50:45 ratio; the flow was 1.5 ml/min.; UV detection was used at 210 nm.

FIG. 2 shows an HPLC (high-performance liquid chromatogram) of the composition of the condensate obtained after the first 3 hours.

EXAMPLE 2

Concentration of volatile compounds of "Bordeaux" red wine (France).

5 ml red wine was weighed and filled into a pressure-stable glass, closed at the edges and connected to a receiver by means of a 150 mm long high-grade steel capillary which had an inner diameter of 0.25 mm. The glass with the red wine was heated in an aluminum block to 70° C. and the receiver was cooled in an ice bath. After 3 hours the concentration process came to a standstill and 120 mg condensate were obtained.

The product was analyzed as in Example 1.

FIG. 3 shows the HPLC chromatogram of volatile substances from "Bordeaux" red wine.

EXAMPLE 3

Aroma substances from ground coffee.

1.5 g ground coffee is heated as described in Example 1 in a glass pressure vessel to 110° C. and the receiver is cooled in an ice bath. After 3 hours the receiver contained a condensate amount of 80 mg aroma substances.

The analytical separating column used in this example was the ame as in Examples 1 and 2. The work was performed at 25° C. with two eluants:

Eluant A—Composition was 0.2 m of a mixture of $H_3PO_4$ and acetonitrile in a ratio of 98:2.

Eluant B—Composition was 0.2 m of a mixture of $H_3PO_4$ and acetonitrile in a ratio of 50:50.

Gradient:
  0 to 60 minutes with 0–50% B
  60 to 75 minutes with 50% B
  75. minute with 0% B
  75 to 90 minutes with 0% B.

The flow was 1.0 ml/min.; UV detection at 210 nm.

FIG. 4 shows the HPLC chromatogram of the aroma substances of ground coffee.

The invention has been described by reference to specific material, structures and compositions. However, no limitation thereto is intended, as changes may be made in details of construction and mode of operation, without departing from the scope of the invention, as defined in the appended claims. For example, the process can be carried out without heating devices 1 and 2 and cooling device 6.

What is claimed is:

1. A method of isolating and concentrating at least one volatile compound from a solid or liquid material containing that volatile compound, said method comprising:
    (A) using an apparatus comprising a closed system which includes a first vessel, a second vessel and a capillary tube having an inner diameter of less than 1 mm such that no back-diffusion is permitted
    (B) placing said solid or liquid material in said first vessel, out of contact with said capillary tube so that the capillary tube is in contact only with a vapor phase in said vessel;
    (C) transferring the volatile compound from said first vessel to said second vessel through said capillary tube; and
    (D) maintaining a temperature gradient between said first and second vessels with the temperature of the second vessel lower than that of the first, so that the volatile compound is transferred to said second vessel in concentrated form, and the use of auxiliary agents in said closed system is avoided.

2. A method according to claim 1 wherein the material from which the capillary is made is metal, glass, quartz or plastic.

3. A method according to claim 1 wherein the material from which the capillary is made is platinum, gold or silver.

4. A method according to claim 1 wherein the material from which the capillary is made is borosilicate glass.

5. A method according to claim 1 wherein the material from which the capillary is made is polyethylene or polyfluoroethylene.

6. A method according to claim 1 in which the inner diameter of the capillary is in the range from 0.10 to 0.5 mm.

7. A method according to claim 1 wherein the material from which the capillary is made is a high-grade steel and the capillary has an inner diameter of 0.25 mm.

* * * * *